US007212135B1

(12) United States Patent
Lynch et al.

(10) Patent No.: US 7,212,135 B1
(45) Date of Patent: May 1, 2007

(54) REAL TIME ANALYSIS AND DISPLAY OF AIRCRAFT APPROACH MANEUVERS

(75) Inventors: Robert E. Lynch, San Carlos, CA (US); Thomas R. Chidester, Mountain View, CA (US); Robert E. Lawrence, Los Altos, CA (US)

(73) Assignee: United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 71 days.

(21) Appl. No.: 11/066,649

(22) Filed: Feb. 22, 2005

Related U.S. Application Data

(63) Continuation-in-part of application No. 10/956,523, filed on Sep. 22, 2004, now Pat. No. 7,075,457.

(51) Int. Cl.
*G01C 21/00* (2006.01)

(52) U.S. Cl. ...................... 340/971; 340/947; 340/960; 244/183; 701/14; 701/16

(58) Field of Classification Search ................ 340/971, 340/945, 970, 967, 972, 973, 948, 960; 244/75.1, 244/180, 181, 183, 96; 701/14, 16
See application file for complete search history.

(56) References Cited

U.S. PATENT DOCUMENTS 6,216,065 B1 * 4/2001 Hall et al. .................... 701/16
6,266,610 B1 * 7/2001 Schultz et al. .............. 701/201
6,611,737 B1 * 8/2003 El-Tahan et al. .............. 701/21
6,711,479 B1 * 3/2004 Staggs ......................... 701/16
6,892,118 B1 * 5/2005 Feyereisen .................. 701/14

* cited by examiner

*Primary Examiner*—Davetta W. Goins
(74) *Attorney, Agent, or Firm*—John F. Schipper; Robert M. Padilla

(57) ABSTRACT

Method and system for monitoring and comparing, in real time, performance of an aircraft during an approach to touchdown along a conventional approach path and along a contemplated modified approach path to touchdown. In a first procedure, a flight parameter value at a selected location is compared and displayed, for the planned path and for the modified path. In a second procedure, flight parameter values $FP(t_n)$ at a sequence $\{t_n\}_n$ of measurement times is compared and displayed, for the planned path and for a contemplated or presently-executed modified path. If the flight parameter for the planned path and for the modified path differ too much from each other, the pilot in command has an option of terminating the approach along the modified path.

12 Claims, 6 Drawing Sheets

REAL TIME ANALYSIS AND DISPLAY OF AIRCRAFT APPROACH MANEUVERS

CROSS REFERENCE TO RELATED APPLICATIONS

This application is a Continuation In Part of a prior application, U.S. Ser. No. 10/956,523, filed 22 Sep. 2004 now U.S. Pat. No. 7,075,457.

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to monitoring and analysis of aircraft flight parameters for approach to a touchdown.

BACKGROUND OF THE INVENTION

An aircraft that is ascending following takeoff or descending on approach will have measurable kinetic energy and potential energy components, and these components will change with time in measurable, if not predictable, manners. Desirable energy states for both takeoff and landing can be determined from aircraft manufacturer guidance for these phases of flight. For example, where the approach occurs at an airport with an operable and reliable instrument landing system (ILS), the ILS system may provide data recorded on the aircraft to serve as a standard for comparing observed kinetic and potential energy components for an aircraft near the ground, below 2500 feet altitude and for an assumed straight path to a touchdown site. If the airport has no operable and reliable ILS, or if the aircraft is not near the ground, another mechanism for providing a standard for measurements or estimates is needed. On takeoff, where no electronic guidance comparable to the glide slope is available, the aircraft climb profile can be compared to manufacturer guidance or to observed performance for recorded aircraft departures from the particular airport.

The airline industry has become concerned with the problem of unstable aircraft approaches, because approach and landing accidents often begin as unstable approaches. An "unstable approach" is often defined as an approach where below a threshold altitude (1000 feet for IFR and 500 feet for VFR), the aircraft is not established on a proper glide path and with a proper air speed, with a stable descent rate and engine power setting, and with a proper landing configuration (landing gear and flaps extended). Airlines have developed approach procedures that call for abandonment of an approach that is determined to be unstable.

Development and testing of methods for detecting atypical flights by N.A.S.A. has revealed that high energy during an arrival phase (below 10,000 feet but before beginning an approach) is the most common reason for a flight to be identified as atypical or out of a statistically normal range. An atypical high energy arrival phase often corresponds to aircraft kinetic energy and/or potential energy that requires dissipation of 10–30 percent more energy than is required for a normal arrival phase. A normal arrival phase may correspond to about a 3 miles per 1000 feet elevation change ("3-to-1") slope glide path and decelerating to an airspeed of about 250 knots during descent through 10,000 feet altitude to a standard reference speed around 2,500 feet altitude, when beginning an approach.

More than half of the high energy arrivals identified by atypicality analysis were brought under control within stabilized approach criteria; some of the remainder of the high energy arrivals were abandoned. In contrast, where these findings were used to define and search for a high-energy arrival exceedance, about three times as many exceedances were detected; and the resulting unstable approaches were found to occur more frequently than the recoveries.

It may be possible to identify, by historical analysis, a first class of high energy arrivals where recovery and subsequent stabilization is possible and relatively easy, and a second class of high energy arrivals in which recovery and subsequent stabilization is likely to be difficult or impossible. However, the present procedures for determining presence of a normal or reference (acceptable) approach include an electronic glide slope that extends linearly from the end of a target runway to the aircraft, whereas a normal aircraft approach path is curved and follows the electronic glide slope only from about 1,800 feet above the field to the end of the runway.

A 3-to-1 glide path slope, corresponding to decrease of 1,000 feet in altitude for every 3 nautical miles horizontal travel; is often desirable during an arrival phase. Air speed is 250 knots or less by regulation below 10,000 feet, and the aircraft decelerates to a lower speed before joining the approach path. These parameters are directly available but are unlikely to prove to be the only relevant parameters in determining whether a flight arrival phase is normal or other than normal.

When an energy component value or orientation component value for a completed flight of interest (referred to herein as a "target flight") has been measured or observed and compared with a corresponding value for a nominal flight, this information should be displayed for possible remedial action on a subsequent flight. A flight operator may also benefit from a display of one or more predictions, based upon the observed or measured target FP values, of the behavior of this FP value over a short time interval extending into the future.

What is needed is a system, and corresponding display, that: (1) estimates at least one flight parameter (FP) value that is likely to occur, when an aircraft executes a contemplated maneuver along a modified flight path during an approach to touchdown, if the maneuver begins at the present or a subsequent location; (2) provides at least one measured FP value, during execution of the maneuver; and (3) compares the measured FP value with a corresponding FP value for a planned flight path under similar conditions. Preferably, the system should recommend at least one supplemental maneuver if it appears that the aircraft is unlikely to execute the original maneuver in an acceptable manner.

SUMMARY OF THE INVENTION

These needs are met by the invention, which receives and analyzes one or more relevant flight parameters (FPs), such as kinetic energy and/or potential energy and changes therein, for an aircraft approaching a touchdown and compares the present FP value with one or a range of nominal or reference FPs for a planned path that correspond to a preferred approach configuration. The system measures or estimates a present FP value FP(t) (referred to as a "measured value" for convenience herein) at each of a sequence of one or more "measurement" times $\{t_n\}_n$ along a modified path, compares at least one measured value with a corresponding FP value for a planned path, displays a representation of the present value and the planned path value, and optionally recommends a supplemental aircraft maneuver where the comparison indicates that a nominal landing using the planned path is unlikely.

In one embodiment, below a selected altitude above ground, such as h=8,000 or 5,000 or 3,000 or 1,800 feet, where the aircraft is approaching a location where a turn or other maneuver is required to bring the aircraft into a proper approach configuration, the system provides a measurement or estimate of one or more present or future FP values during the maneuver, if the aircraft were to begin the contemplated maneuver at the present or a subsequent location, and provides one or more measured FP values as the maneuver is executed. Initially, the measured FP value for the maneuver may differ substantially from the corresponding planned path FP value. Ideally, the measured FP value for the maneuver will quickly approach the corresponding planned path FP value as the maneuver is being executed. Optionally, if the measured FP value does not approach the nominal or reference FP value quickly enough, the system recommends a modified maneuver, which may include aborting the original maneuver. A drag appliance for an aircraft can be inactivated, partly activated or fully activated.

DESCRIPTION OF BEST MODES OF THE INVENTION

Figure 1A:
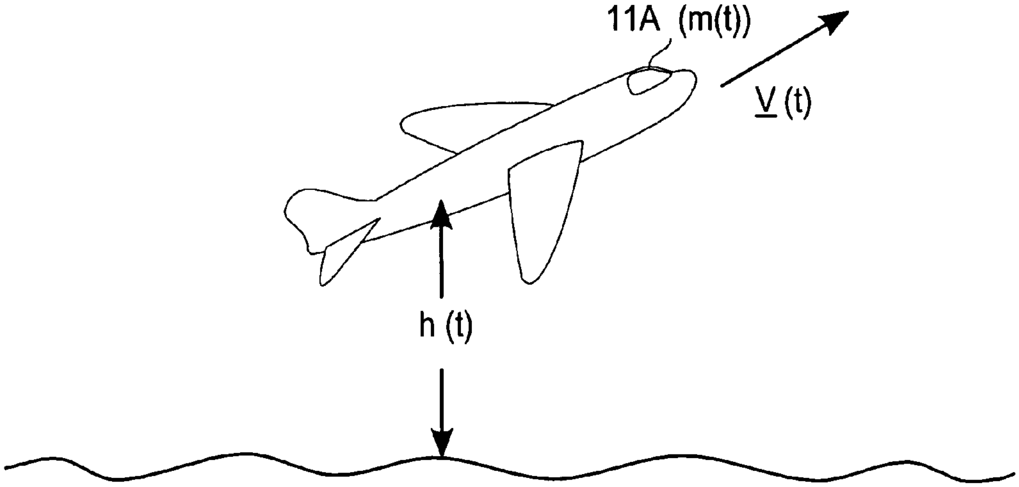
FIG. 1 illustrates a general environment in which the invention can be practiced.
Figure 1B:
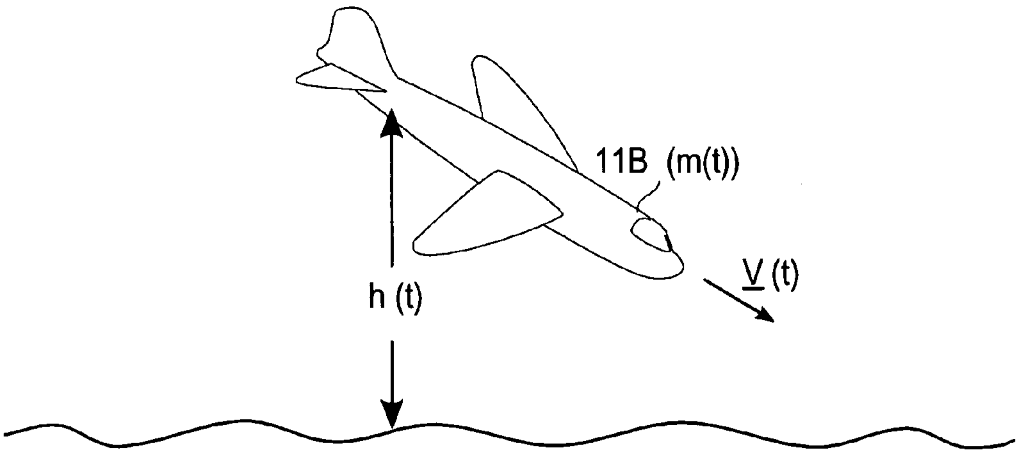

In FIG. 1, an aircraft 11 is following, or contemplates following, a planned path PP to a waypoint WP on a final segment F of an approach path. The waypoint WP has an associated set of relevant flight parameter (FP) values, such as aircraft kinetic energy, aircraft potential energy and other relevant flight configuration values that must lie within small ranges surrounding nominal values for these FPs, in order that the aircraft be acceptably configured for an approach at an airport A associated with the final approach segment F.

The aircraft operator (pilot in command or other responsible individual) contemplates modifying the approach path to follow a modified path MP, as shown in FIG. 1, in response to changed circumstances, and the operator wishes to estimate whether each of the relevant set of FP values will be within an acceptable range for that FP, when the aircraft passes the waypoint WP. If the aircraft 11 is allowed to follow the planned approach path PP, a selected flight parameter (FP) will have a sequence of nominal FP values $\{FP(t_n;PP)\}_n$, measured at a sequence of measurement times $\{t_n\}_n$ as the aircraft follows the planned path. The planned path FP values may differ from one type of aircraft to another, from one airport to another, and from one airline operator to another and may depend upon the local weather conditions. One concern here is how closely the present FP values $FP(t_n;MP)$ for a modified path will approximate the corresponding planned path FP values $FP(t_n;PP)$, when the aircraft 11 joins the final segment F at a join point JP and/or when the aircraft passes the waypoint WP and thereafter follows the approach path final segment F.

A relevant FP may be aircraft kinetic energy KE(t), aircraft potential energy, an energy component sum E(t) =d1·KE(t)+d2·PE(t), which are defined as follows:

$$KE(t)=m(t)\cdot v(t)^2/2+\omega(\tau)\cdot I(t)\cdot\omega(t)/2, \quad (1)$$

$$PE(t)=m(t)\cdot g\cdot h(t), \quad (2)$$

$$E(t)=d1\cdot KE(t)+d2PE(t), \quad (3)$$

where m(t) is the instantaneous aircraft mass (taking account of fuel consumption), I(t) is an instantaneous moment of inertia tensor for the aircraft, ω(t) is an aircraft rotation vector, computed with reference to a center of gravity or other selected location determined with reference to the aircraft (optional), v(t)=dx/dt is the instantaneous aircraft velocity, h(t) is the instantaneous height of aircraft cg above local reference height, such as local ground height, and d1 and d2 are selected real numbers, not both zero (e.g., (d1,d2)=(1,0), (0,1), (1,1) or (1,−1)). The rotational component of kinetic energy may be negligible or may be ignored for other reasons. For an approach to touchdown, the flight parameter of greatest concern is often kinetic energy KE(t). Other relevant FPs include potential energy PE(t); energy component E(t)=d1·KE(t)+d2·PE(t); energy component time derivative (d/dt)E(t), thrust power, vertical speed, ground air speed, aircraft mass, height above ground, flap position, speed brake position, landing gear position, other drag indices, roll, pitch and/or yaw angles; and angle of attack.

At least two different procedures can be implemented here. In a first procedure, FP values at one or more locations along the modified path MP are modeled, and the FP value at the waypoint WP is estimated and compared with an ideal or desired FP value that would be present if the aircraft followed the planned path PP. If these two waypoint FP values differ too strongly from each other, the aircraft operator is advised of this condition and is given an opportunity to terminate a flight along the modified path. If these two FP values differ by a relatively small amount, the operator is given an opportunity to alter one or more FP values along the planned path PP so that the waypoint FP values agree more closely. This procedure might be characterized as a single point comparison procedure and is normally implemented early along the modified path MP.

Figure 2:
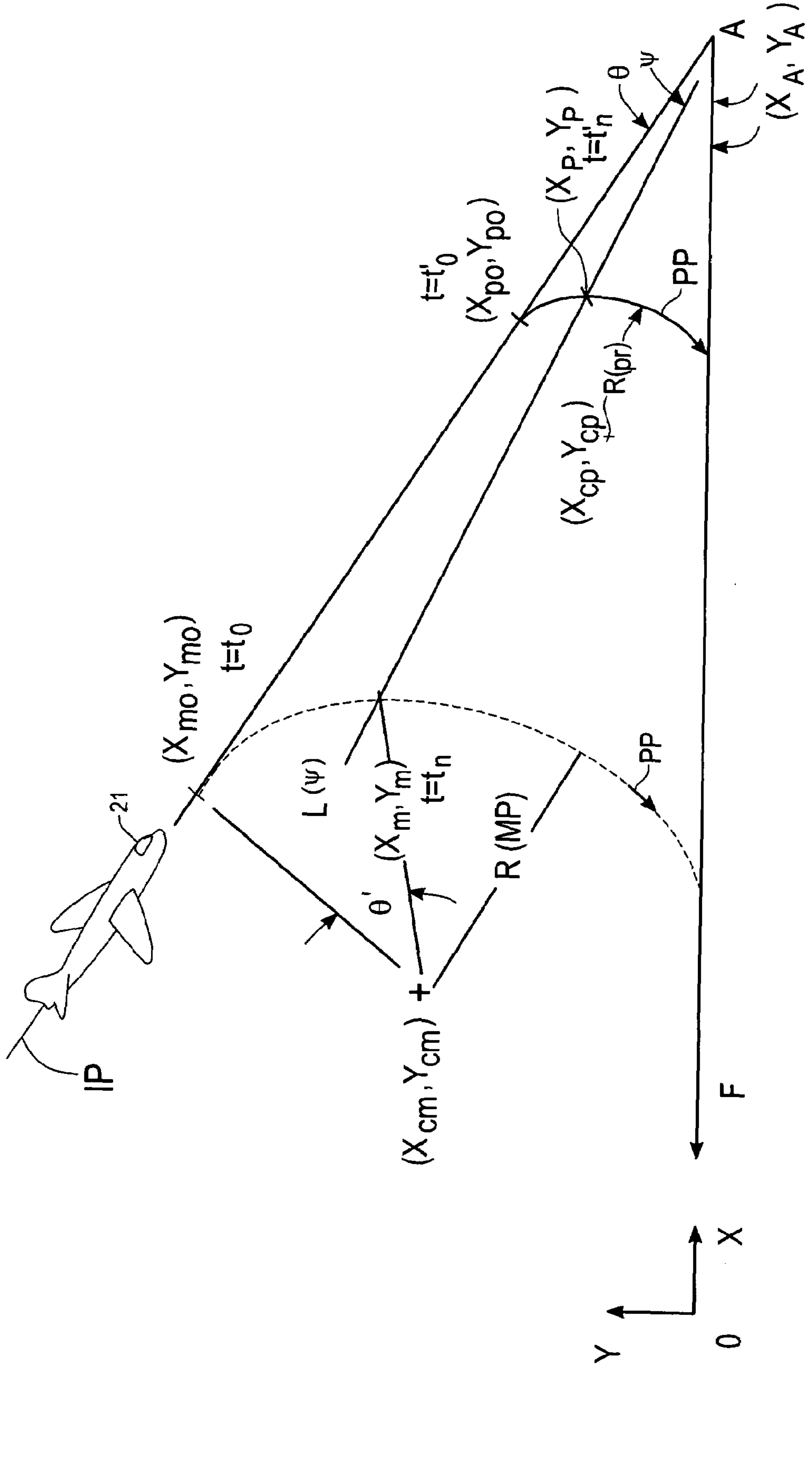
FIGS. 2, 3 and 4 illustrates relationship of a planned path and a modified path for three path modification maneuvers.

In a second procedure, FP values, $FP(t_n;MP)$ and $FP(t'_n;PP)$, along the modified path MP and along the planned path PP, respectively, are measured or estimated at corresponding times, $t_n$ and $t'_n$, and are compared to determine how well the FP values $FP(t_n;MP)$ are approaching (or will approach) the FP values $FP(t'_n;PP)$ as the join point JP is approached. If it becomes clear that FP values $FP(t_n;MP)$ will not approach the desired FP values at the join point JP, the aircraft operator is advised of this condition and is given an opportunity to terminate a flight along the modified path. If the FP values $FP(t_n;MP)$ are approaching the FP values $FP(t'_n;PP)$ sufficiently quickly as the join point JP is approached, the operator is given an opportunity to alter one or more FP values along the planned path PP so that the join point FP values agree more closely. This procedure might be characterized as a multiple point comparison procedure and allows a decision to terminate or continue to be made at any time along the modified path.

Where the first procedure is followed, temporal behavior of the aircraft FP should be modeled to allow an estimate of the MP FP value at the waypoint. This procedure may, or may not, require specification of details of the modified path MP. For example, if the FP is the kinetic energy component KE(t), one concern may be whether the kinetic energy can be reduced sufficiently along the modified path MP so that FP($t_n$) at the waypoint WP is substantially the same as the desired kinetic energy component, for continuation along the final approach segment F. For this situation, the effect of drag forces fully applied by all drag appliances plus the effect of increase in kinetic energy due to decrease of potential energy should be accounted for, to determine if the aircraft kinetic energy can be reduced to no greater than the desired value at the waypoint WP.

Where the second procedure is followed, relevant details of the modified path and the planned path must be specified. Three examples of modified path maneuvers are discussed here. In FIG. 2, an aircraft 21 is moving along an initial path IP in an approximately horizontal plane and would normally continue along a curvilinear planned path PP to turn by an angle π−θ with a substantially constant turn radius R(PP) to follow a final approach segment F. Alternatively, the aircraft 11 can follow a curvilinear modified path MP, turning by the same angle π−θ with a substantially constant turn radius R(MP) to follow the final approach segment F. The curvilinear paths PP and MP begin at locations with the respective coordinate pairs ($x_{p0}$,$y_{p0}$) and ($x_{m0}$,$y_{m0}$), where the triangle apex A has the coordinates ($x_A$,$y_A$). The ratio of the radii R(MP) and R(PP) and the locations, ($x_{cm}$,$y_{cm}$) and ($x_{cp}$,$y_{cp}$) of the turn centers can be determined from $$R(MP)/R(PP)=\{(x_{m0}-x_A)^2+(y_{m0}-y_A)\}^{1/2}/\{(x_{p0}-x_A)^2+(y_{p0}-y_A)^2\}^{1/2}, \quad (5)$$

$$(x_{cm}-x_A)/(x_{cp}-x_A)=(y_{cm}-y_A)/(y_{cp}-y_A)=R(MP)/R(PP). \quad (6)$$

Correspondence of measurement or estimation times, $t_n$ and $t'_n$, for the modified path MP and the planned path PP can be determined in several manners. One intuitively appealing approach for a circular turn, illustrated in FIG. 2, extends a straight line L(Ψ) from the apex A to intersect the curvilinear paths PP and MP at the respective locations ($x_p$,$y_p$) and ($x_m$,$y_m$), which are associated with corresponding times, $t'_n$ and $t_n$. Where the radial centers, CP and CM, for the two circular sectors representing the paths PP and MP lie on the common line L(Ψ=Ψ0), one can verify that the location pairs ($x_p$,$y_p$) and ($x_m$,$y_m$) lying on these circular sectors correspond to the same rotation angle θ' ($0\leqq\theta'\leqq\pi-\theta$), using the cosine formula. This information can be used to determine the corresponding measurement times, $t_n$ and $t'_n$, as follows.

Assume that the aircraft begins its turn along the curvilinear paths PP and MP at times $t=t'_0$ and $t=t_0$, respectively, and that the velocities (assumed to be constant and to be determined by the desired turn radius and the required bank angle) are $v_p$ and $v_m$, respectively. The partial turns (by angle θ') along the planned path PP and along the modified path MP require time intervals of R(PP)(θ')/($v_p$) and R(MP)(θ')/($v_m$), respectively, and these locations are also determined by the intersection of the line L(Ψ) with the curvilinear paths PP and MP. Accordingly, the measurement times $t'_n$ and $t_n$ are related approximately by $$t'_n=t'_0+R(PP)(\theta')/(v_p), \quad (7A)$$

$$t_n=t_0+R(MP)(\theta')/(v_m), \quad (7B)$$

for this maneuver.

Figure 3:
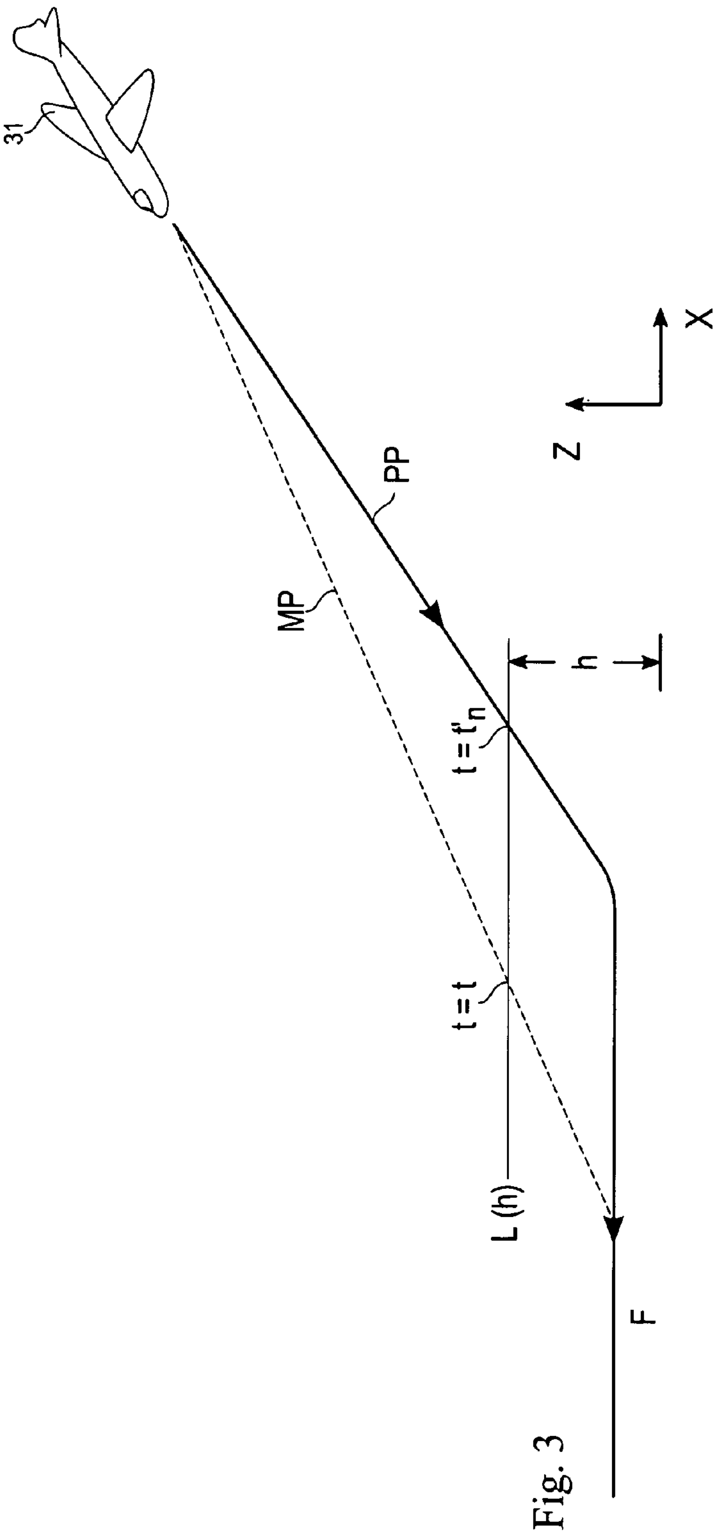

FIG. 3 illustrates descent of an aircraft 31 in a vertical plane to join a final segment F of an approach path, along a planned path PP and along a modified path MP as shown. Here, the corresponding measurement times, $t'_n$ and $t_n$, can be determined as the times the respective paths cross a selected constant altitude line L(h) that is parallel to the final segment F. The modified path MP will require a different descent rate, with different flap angle settings and/or a different value of thrust so that the FP values for kinetic energy, KE($t_n$;PP) and KE($t_n$;MP), will differ and the FP values of potential energy, PE($t_n$;PP) and PE($t_n$;MP), will also differ.

Figure 4:
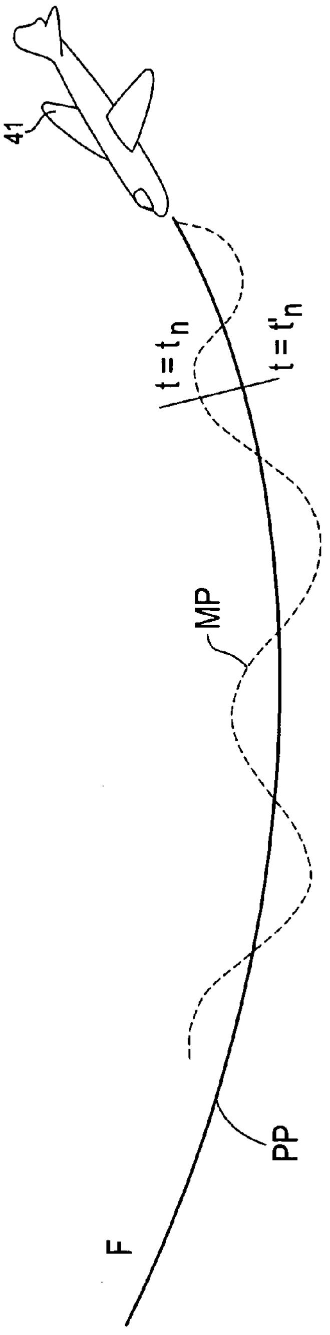

In FIG. 4, an aircraft 41 follows a planned flight path PP (which may be a straight line or a curved line). Alternatively, the aircraft 11 may follow a modified flight path MP that undulates about the planned path PP, in order to dissipate some of the aircraft kinetic energy and reduce KE(t) to a smaller value as the aircraft approaches a waypoint or a landing site. The corresponding measurement times, $t'_n$ and $t_n$, for this maneuver may be determined for the same coordinate (x) measured along the line L.

Relative to the planned approach path PP, the modified approach path MP may include maneuvers such as: executing a turn, at a different location and/or with a different turn radius, to join a final segment F of the approach path; executing a change in altitude, having a larger or smaller descent rate, to join the final segment F; and executing an undulating motion, in a horizontal plane and/or in a vertical direction, to dissipate a portion of the aircraft kinetic energy before joining the final segment F. The invention covers these planned path and modified path maneuvers and any other pair of maneuvers for which pairs of corresponding measurement times, $t'_n$ and $t_n$, can be determined.

Figure 5:
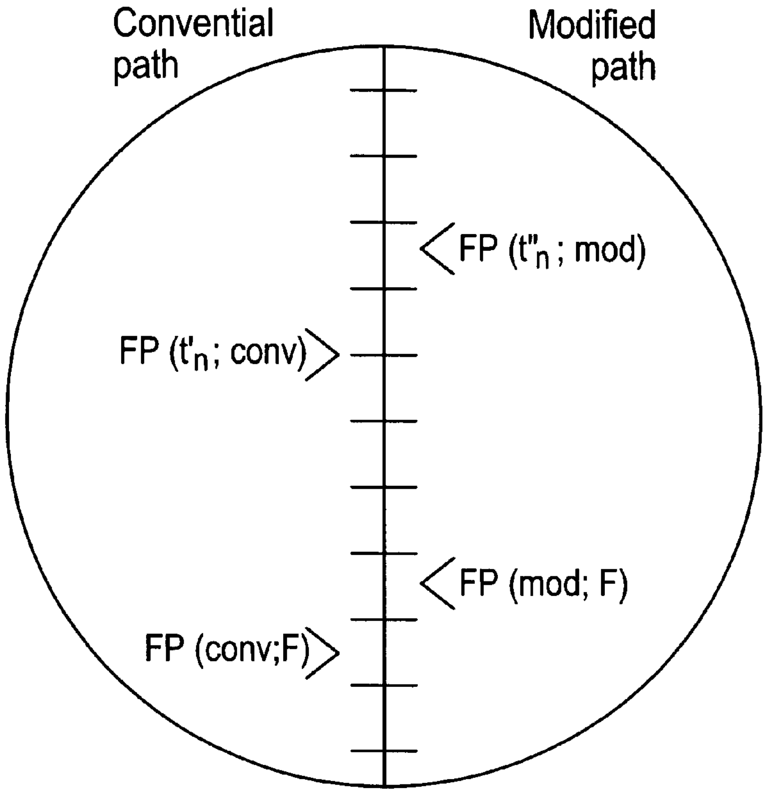
FIG. 5 illustrates data displayed on a screen according to the invention.

FIG. 5 illustrates an embodiment of a screen according to the invention that displays the present FP values, FP($t'_n$;conv) and FP($t_n$;mod), for the respective nominal approach path and the contemplated or presently-executed approach path, in a graphic format and/or in an alphanumeric format, for substantially instantaneous comparison by a pilot in command or a flight engineer, to determine whether following the modified flight path will produce an acceptable result when the final segment F of the approach path is reached. The measurement times, $t'_n$ and $t_n$, may be the same time or, optionally, are times that correspond to each other on the planned approach path and the modified approach path, respectively. Optionally, a second pair of FP values, FP(PP;F) and FP(MP;F), are displayed, in a graphic format and/or an alphanumeric format, that indicate a projected FP value at the projected time the aircraft joins the final segment F, for the planned path and for the modified path, respectively.

Figure 6:
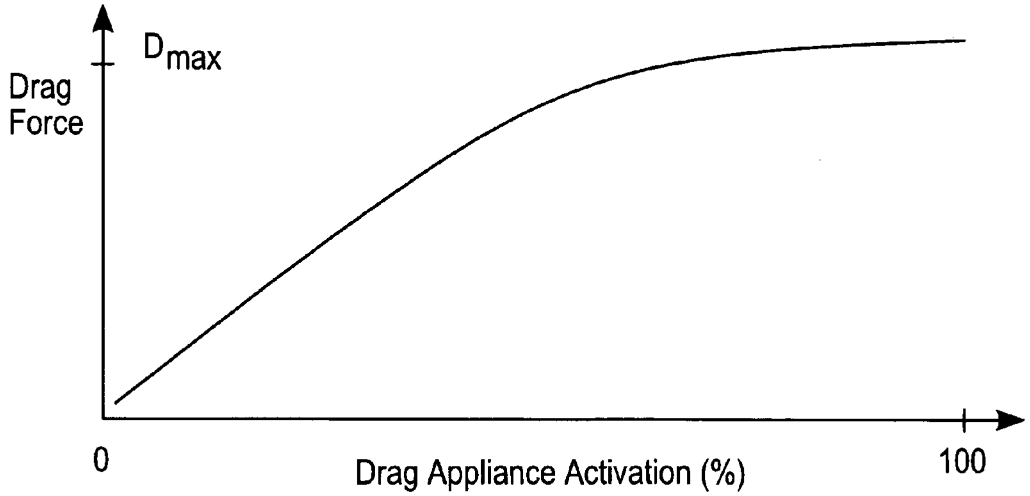
FIG. 6 graphically illustrates drag force versus activation percentage for a drag appliance.

Each aircraft has an associated group of drag indices, one for each activatable drag appliance (landing gear, wing flaps, elevator, etc.). Each drag index has a maximum value where the drag appliance is fully activated and has a spectrum of drag values extending from zero activation through less than full activation to full activation of the appliance, as illustrated schematically in FIG. 6. With the drag appliance completely inactivated, the corresponding drag index is normally 0. The drag force associated with one drag appliance is assumed to be independent of the drag force associated with another drag appliance, in a first approximation. In an approach to landing, for example, where a relatively small amount of additional drag force is required for fine adjustment, one or more drag appliances can be partly or fully activated to provide this small additional drag force, relying on information illustrated in FIG. 6 for each drag appliance. If the amount of additional drag force needed for the adjustment is greater than the maximum drag force associated with all the drag appliances, the aircraft will need to use additional procedures to provide the additional drag force or to reduce engine thrust, or the approach should be terminated and reconfigured. In practice, some drag appliances, such as landing gear, are normally inactivated or fully activated, while other drag appliances, such as speed brakes, have a near-continuous range of settings. The sum of the drag indices for all (activated) drag appliances is determined and provided as a supplement to the drag force(s) provided by the other aircraft components.

Monitoring of thrust power developed by the engine(s) of the aircraft is straightforward and is an important control variable in change of the energy component E(t) defined in Eq. (3). Thrust developed can be estimated using measured fuel flow rate and other relevant variables.

Aircraft angle of attack of the aircraft can be measured, made available and recorded on the aircraft.

The flight parameters measured and analyzed here may include kinetic energy KE(t), potential energy PE(t), energy component E(t), time derivative of energy component (d/dt) E(t), drag index for one or more drag appliances, flap angles, angle of attack, and other relevant FPs.

Figure 7:
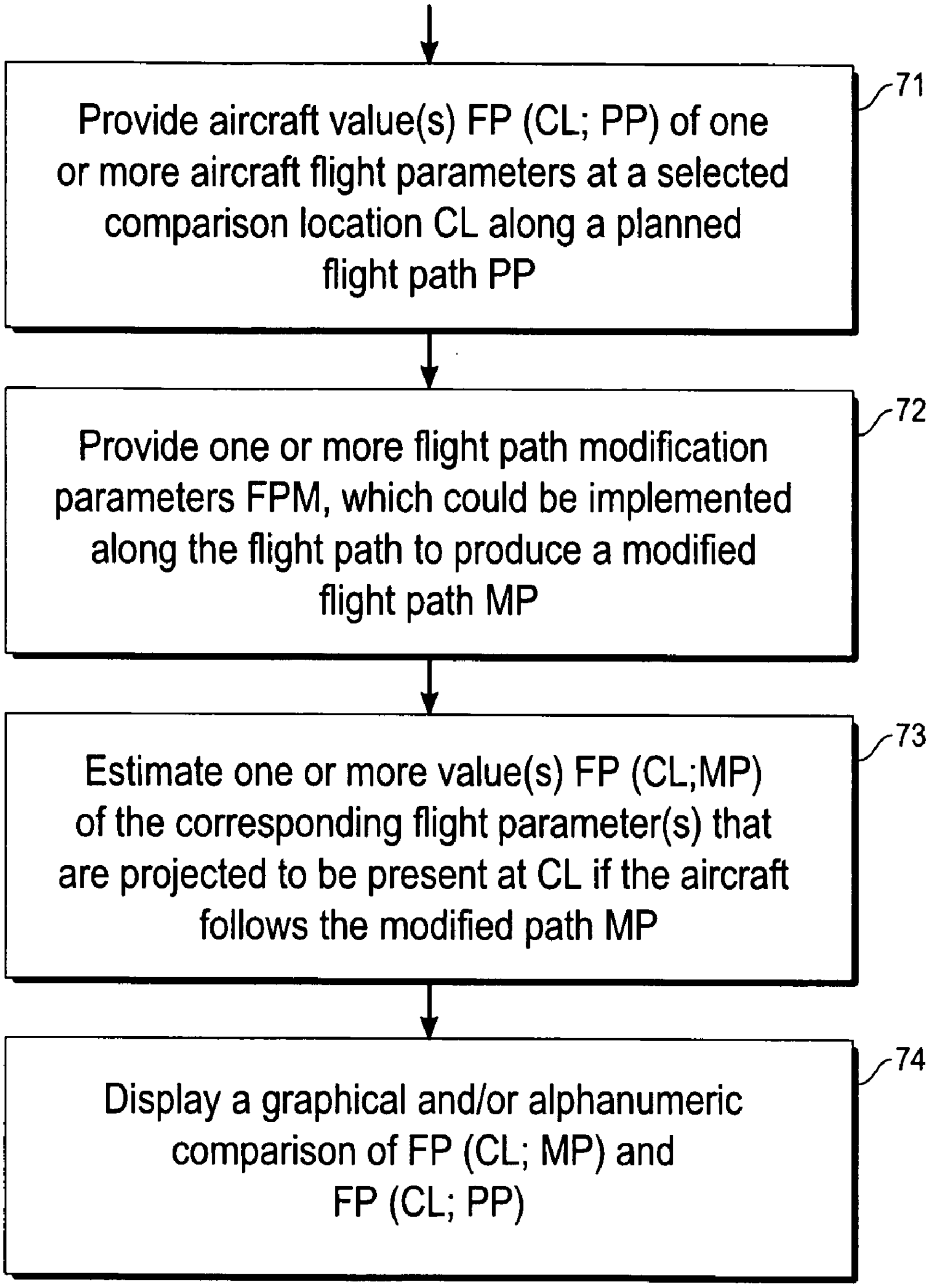
FIGS. 7 and 8 are flow charts for methods for practicing the invention.

FIG. 7 is a flow chart of a method for practicing the first procedure of the invention. In step 71, the system receives or measures or otherwise provides values FP(CL;PP) of one or more aircraft flight parameters for a selected comparison location CL during an approach to touchdown along a planned approach path PP. In step 72, the system receives or otherwise provides one or more flight path modification parameters FPM, which could be implemented along the aircraft flight path to produce a modified path MP. In step 73, the system estimates one or more corresponding values FP(CL;MP) of flight parameters that are projected to be present at the comparison location CL, if the aircraft follows the modified path MP. In step 74, the system displays, in at least one of a graphical format and an alphanumeric format, a comparison of FP(CL;MP) and FP(CL;PP). From this comparison, the aircraft operator can determine whether following the modified path MP will provide an acceptable result at the comparison location CL.

Figure 8:
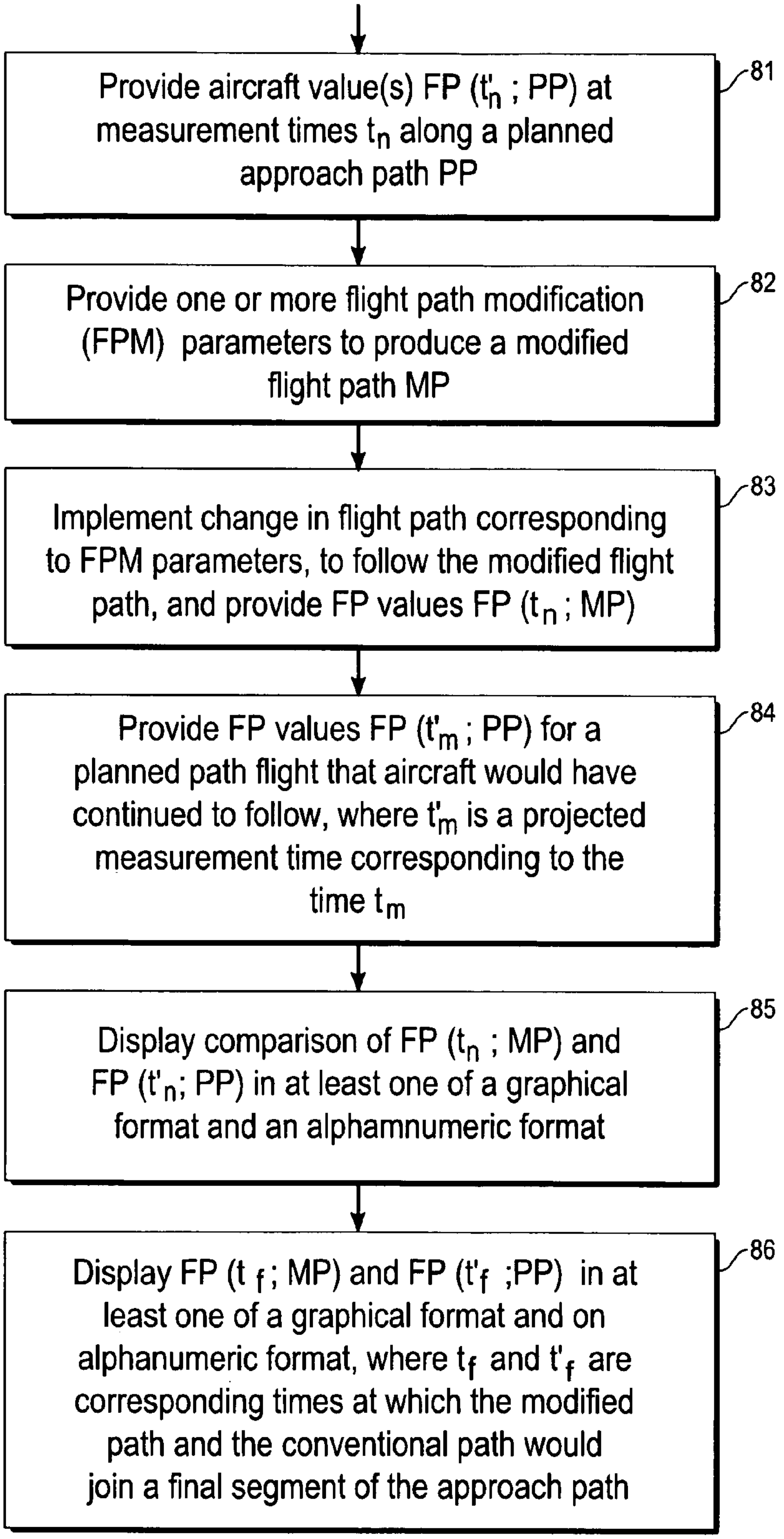

FIG. 8 is a flow chart of a method for practicing the second procedure of the invention. In step 81, the system receives or measures or otherwise provides aircraft flight parameter values $FP(t_n)$ at a sequence $\{(t_n)\}_n$ of one or more measurement times during an approach to touchdown along a planned approach path. In step 82, the system receives or otherwise provides one or more flight path modification parameters FPM, which could be implemented at along the flight path to produce a modified path MP. In step 83, the system implements a change to follow the modified path and now provides FP values $FP(t_n;MP)$ for the aircraft along the modified path. In step 84, the system provides nominal FP values $FP(t'_n;PP)$ for a planned flight path PP that the aircraft could have continued to follow, where $t'_n$ is a projected measurement time corresponding to the measurement time $t_n$ in step 83. In step 85, the system displays, in at least one of a graphical format and an alphanumeric format, a comparison of $FP(t_n;MP)$ and $FP(t'_n;PP)$. In step 86 (optional), the system displays, in at least one of a graphical format and an alphanumeric format, FP values $FP(t_F;MP)$ and $FP(t'_F;PP)$, where $t_F$ and $t'_F$ are corresponding times for the modified path and the planned path, respectively, for a selected location along a final segment of the approach path. From this comparison, the aircraft operator can determine whether following the modified path MP will provide an acceptable result at a selected location, or if proceeding along the modified path should be terminated.

What is claimed is:

1. A method of monitoring real time performance of an aircraft, the method comprising:

providing aircraft flight parameter values $FP(t_n)$ at a sequence $\{(t_n)\}_n$ of one or more measurement times during an approach to touchdown along a planned approach path PP;

receiving one or more flight path modification parameters, which can be implemented along the present aircraft approach path to produce a modified approach path MP;

implementing the one or more flight path modification parameter at a selected location to follow the modified path and providing at least one estimated FP value $FP(t_n;MP)$ for the aircraft along the modified approach path;

providing FP values $FP(t'_n;PP)$ for a planned flight path that the aircraft would have continued to follow along the planned approach path, where $t'_n$ is a projected measurement time corresponding to, or determined with reference to, the measurement time $t_n$ along the modified approach path; and displaying, in at least one of a graphical format and an alphanumeric format, a comparison of $FP(t_n;MP)$ and $FP(t'_n;PP)$.

2. The method of claim 1, further comprising displaying, in at least one of a graphical format and an alphanumeric format, said FP values $FP(t_F;MP)$ and $FP(t'_F;PP)$, where $t_F$ and $t'_F$ are corresponding times at which said modified approach path and said conventional approach path, respectively, are projected to join a final segment to touchdown of said approach path.

3. The method of claim 1, further comprising choosing said flight modification parameters to comprise at least one parameter corresponding to a turn of said aircraft to join a final segment to touchdown of said approach path.

4. The method of claim 1, further comprising choosing said flight modification parameters to comprise at least one parameter corresponding to change of elevation of said aircraft to join a final segment to touchdown of said approach path.

5. The method of claim 1, further comprising choosing said flight modification parameters to comprise at least one parameter corresponding to execution of an undulating motion, as part of said modified approach path MP, about a line that coincides with a portion of said planned approach path PP.

6. The method of claim 1, further comprising selecting at least one of said flight parameters from a group that includes kinetic energy KE(t), potential energy PE(t), energy component $E(t)=d1\cdot KE(t)+d2\cdot PE(t)$, energy component time derivative (d/dt)E(t), thrust power, vertical speed, ground air speed, aircraft mass, height above ground, flap position, speed brake position, landing gear position, at least one drag index, roll angle, pitch angle yaw angle; and angle of attack.

7. A system of monitoring real time performance of an aircraft, the system comprising a computer that is programmed:

to provide aircraft flight parameter values $FP(t_n)$ at a sequence $\{(t_n)\}_n$ of one or more measurement times during an approach to touchdown along a planned approach path PP;

to receive one or more flight path modification parameters, which can be implemented along the present aircraft approach path to produce a modified approach path MP;

to implement the one or more flight path modification parameters at a selected location to follow the modified path and to provide at least one estimated FP value $FP(t_n;MP)$ for the aircraft along the modified approach path;

to provide FP values $FP(t'_n;PP)$ for the planned flight path that the aircraft would have continued to follow along the planned approach path, where $t'_n$ is a projected measurement time corresponding to, or determined with reference to, the measurement time $t_n$ along the modified approach path; and to display, in at least one of a graphical format and an alphanumeric format, a comparison of $FP(t_n;MP)$ and $FP(t'_n;PP)$.

8. The system of claim 7, wherein said computer is further programmed to display, in at least one of a graphical format and an alphanumeric format, FP values $FP(t_F;mod)$ and $FP(t'_F;conv)$, where $t_F$ and $t'_F$ are corresponding times at which said modified approach path and said planned approach path, respectively, are projected to join a final segment to touchdown of said approach path.

9. The system of claim 7, wherein said computer is further programmed to choose said flight modification parameters to comprise at least one parameter corresponding to a turn of said aircraft to join a final segment to touchdown of said approach path.

10. The system of claim 7, wherein said computer is further programmed to choose said flight modification parameters to comprise at least one parameter corresponding to change of elevation of said aircraft to join a final segment to touchdown of said approach path.

11. The system of claim 7, wherein said computer is further programmed to choose said flight modification parameters to comprise at least one parameter corresponding to execution of an undulating motion, as part of said modified approach path, about a line that coincides with a portion of said planned approach path.

12. The system of claim 7, wherein said computer is further programmed to choose at least one of said flight parameters from a group that includes kinetic energy KE(t), potential energy PE(t), energy component $E(t)=d1\cdot KE(t)+d2\cdot PE(t)$, energy component time derivative $(d/dt)E(t)$, thrust power, vertical speed, ground air speed, aircraft mass, height above ground, flap position, speed brake position, landing gear position, drag indices, roll angle, pitch angle and/or yaw angle; and angle of attack.

* * * * *